(12) United States Patent
Narukawa

(10) Patent No.: US 8,259,362 B2
(45) Date of Patent: Sep. 4, 2012

(54) IMAGE FORMING SYSTEM, IMAGE FORMING APPARATUS AND COPYING APPARATUS

(75) Inventor: Toshiki Narukawa, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1157 days.

(21) Appl. No.: 11/862,446

(22) Filed: Sep. 27, 2007

(65) Prior Publication Data

US 2008/0080016 A1 Apr. 3, 2008

(30) Foreign Application Priority Data

Sep. 29, 2006 (JP) .................................. 2006-266913

(51) Int. Cl.
*H04N 1/40* (2006.01)
*G06F 3/12* (2006.01)

(52) U.S. Cl. ........ 358/449; 358/1.15; 358/1.6; 347/101; 271/291; 355/24

(58) Field of Classification Search .................. 358/449, 358/1.15, 1.6; 271/291; 355/24; 347/101
See application file for complete search history.

(56) References Cited

U.S. PATENT DOCUMENTS

| | | | | |
|---|---|---|---|---|
| 5,282,058 A | * | 1/1994 | Tsuboi et al. | 358/449 |
| 5,808,752 A | * | 9/1998 | Naba | 382/234 |
| 2003/0086127 A1 | * | 5/2003 | Ito et al. | 358/462 |
| 2004/0190084 A1 | * | 9/2004 | Shirai | 358/474 |
| 2004/0207871 A1 | * | 10/2004 | Ando | 358/1.15 |
| 2006/0050319 A1 | * | 3/2006 | Suzuki | 358/3.24 |

FOREIGN PATENT DOCUMENTS

| | | | |
|---|---|---|---|
| JP | 62-171383 A | | 7/1987 |
| JP | 05-022609 A | | 1/1993 |
| JP | 05-176185 A | | 7/1993 |
| JP | 06340130 A | * | 12/1994 |
| JP | 07-184063 A | | 7/1995 |
| JP | 09-247423 A | | 9/1997 |
| JP | 2003-226048 | | 8/2003 |
| JP | 2004-209924 | | 7/2004 |
| JP | 2006-148704 | | 6/2006 |

OTHER PUBLICATIONS

JP Office Action dtd Jan. 3, 2011, JP Appln. 2006-266913, English translation.

* cited by examiner

*Primary Examiner* — Marivelisse Santiago Cordero
*Assistant Examiner* — Huo Long Chen
(74) *Attorney, Agent, or Firm* — Banner & Witcoff, Ltd.

(57) ABSTRACT

An image forming system includes a first data compressing device, a data decompressing device, and an image forming device. The first data compressing device stores image data of a top line to be formed on a recording medium first and image data of a designated line other than the top line in a memory area with a data format capable of forming the original image data by itself, while generating difference data which indicates a difference between image data of a non-designated line other than the top and the designated lines and the image data of a line adjacent to the non-designated line, and stores the difference data in the memory area. The data decompressing device sequentially decompresses the image data of each line, based on the image data and the difference data. The image forming device forms an image on the recording medium, based on the decompressed image data.

17 Claims, 14 Drawing Sheets

IMAGE FORMING SYSTEM, IMAGE FORMING APPARATUS AND COPYING APPARATUS

CROSS-REFERENCE TO RELATED APPLICATIONS

This application claims the benefit of Japanese Patent Application No. 2006-266918 filed Sep. 29, 2006 in the Japan Patent Office, the disclosure of which is incorporated herein by reference.

BACKGROUND

This invention relates to a technique for compressing image data obtained by reading an image on a document and decompressing the image data into the original image data when forming an image on a recording medium.

Conventionally, an image forming apparatus wherein image data obtained by reading an image on a document is MR (Modified Relative Element Address Designate) encoded, once stored in a memory, and then decompressed into the original image data when forming an image on a sheet of paper has been known.

More specifically, in the image forming apparatus, image data of a line first read from the document among image data on the document is stored in the memory without being compressed. On the other hand, as for image data of each line after the first-read line, only the difference data from image data of the preceding line which has been read prior to each line is stored in the memory.

When forming an image on a sheet of paper, the non-compressed image data (the image data of the first-read line) is read out to a buffer area so as to form an image on the sheet of paper, and then the difference data is overwritten in sequence on the buffer area, thereby an image is formed on the sheet of paper while the image data of other lines is sequentially decompressed into the original image data.

In the case where an image is formed on one side of a sheet of paper and then another image is formed on the other side of the sheet of paper, generally not only are the sides of the paper flipped, but also the orientation of the sheet of paper with respect to a conveying direction is reversed. Therefore, the image needs to be formed in the inverse order to the order of reading images as relates to the other side.

In this case, the image forming apparatus as described above stores only the difference data except for the first-read line. Consequently, the compressed image data cannot be decompressed in the inverse order to the read order.

Therefore, an image forming apparatus has been invented wherein image data of an image to be formed on a sheet of paper in the read order is MR encoded and stored in a memory while image data of an image to be formed on the sheet of paper in the inverse order to the read order is stored in the memory without being compressed.

SUMMARY

When images on a plurality of documents are read sequentially and formed on both sides of sheets of paper sequentially, an image forming apparatus needs to store image data obtained by reading all of the documents in the memory.

However, the image forming apparatus invented as described above does not compress image data of an image to be formed on one side of a sheet of paper. This results in a problem that an amount of image data which can be stored at a time is lowered.

As a solution to the problem, there is a method that image data which needs to be formed on a sheet of paper in the inverse order to the read order is MR encoded in the inverse order to the read order and is decompressed into the original image data in sequence from image data of the line which has been read last.

When this method is employed, however, it is necessary for image data of lines which have been read at the last to be discarded without being formed on a sheet of paper in order to align top positions of images to be formed on both sides of the sheet of paper when a length of the sheet of paper is shorter than a length of the document. In this case, decompression is started from a line halfway. Since there is only the difference data for the line halfway, there is a problem that decompression from the line cannot be conducted.

In one aspect of the present invention, it would be desirable to provide a technique capable of forming an image appropriately in accordance with a length of a recording medium while compressing image data obtained by reading an image of a document.

An image forming system of a first aspect of the present invention includes a first data compressing device, a data decompressing device, and an image forming device. The first data compressing device includes a first data storage unit and a second data storage unit. The first data storage unit stores image data of a top line to be formed on a recording medium first and image data of at least one designated line other than the top line which is predesignated among image data obtained by reading an image of a document in a memory area with a data format capable of forming the original image data by itself. The second data storage unit generates difference data which indicates a difference between image data of at least one non-designated line which is a line except the top and the at least one designated line and the image data of a line adjacent to the at least one non-designated line, and stores the generated difference data in the memory area. The data decompressing device sequentially decompresses the image data of each line, based on the image data and the difference data stored in the memory area. The image forming device forms an image on the recording medium, based on the image data decompressed by the data decompressing device.

The image forming system stores not only the image data of the top line but also the image data of the designated line in the memory area with a data format capable of forming the original image data by itself when compressing the image data. Accordingly, the decompression of the image data can be started from the designated line.

That is, according to the image forming system, it becomes possible to start the decompression from the image data of the designated line based on a length of a recording medium, thereby allowing an image to be formed appropriate to the length of the recording medium.

An image forming system of a second aspect of the present invention includes a data compressing device, a whole data decompressing device, a comparing device, and an image forming device. The data compressing device includes a first data storage unit and a second data storage unit. The first data storage unit stores image data of a top line to be formed on a recording medium first among image data obtained by reading an image on a document in a memory area with a data format capable of forming the original image data by itself. The second data storage unit generates difference data which indicates a difference between image data of at least one line except the top line and image data of a line adjacent to the at least one line and stores the generated difference data in the memory area. The whole data decompressing device decompresses the image data of all lines, based on the image data and difference data stored in the memory area. The comparing device compares a length of the recording medium along a crosswise orientation of each line with a length of the document along a crosswise orientation of each line. The image forming device includes a first image forming unit, a data discarding unit, and a second image forming device. The first image forming device forms an image on the recording medium, based on all of the image data decompressed by the whole data decompressing device, when the comparing device determines that the length of the recording medium is equal to or longer than the length of the document. The data discarding unit discards the image data of a line in an area which is longer than the length of the recording medium from all of the image data decompressed by the whole data decompressing device, when the comparing device determines that the length of the recording medium is shorter than the length of the document. The second image forming device that forms an image on the recording medium based on the remainder of the image data when the data discarding device is actuated.

The image forming system exhibits the same effects as the image forming system of the first aspect. Furthermore, since the image data of all lines except the top line is completely compressed, the image forming system can store more image data in the memory area than the image forming system of the first aspect.

An image forming apparatus of a third aspect of the present invention includes the image forming system of the first aspect. The image forming apparatus exhibits the same effects as the image forming system of the first aspect.

An image forming apparatus of a fourth aspect of the present invention includes the image forming system of the second aspect.

The image forming apparatus exhibits the same effects as the image forming system of the second aspect.

A copying apparatus of a fifth aspect of the present invention includes an image forming apparatus of the third aspect and an image reading device. The image reading device reads an image of a document, obtains image data and supplies the obtained image data to the image forming apparatus.

According to the copying apparatus, the same effects as the image forming apparatus of the third aspect can be exhibited when copying the document.

A copying apparatus of a sixth aspect of the present invention includes an image forming apparatus of the fourth aspect and an image reading device. The image reading device reads an image of a document, obtains image data and supplies the obtained image data to the image forming apparatus.

According to the copying apparatus, the same effects as the image forming apparatus of the fourth aspect can be exhibited when copying the document.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

First Embodiment

In a first embodiment, the present invention is applied to a multi function apparatus serving at least as a scanner, a printer and a copying apparatus. Hereinafter, a direction is indicated with reference to a front face of the multi function apparatus.
<Overall Structure of the Multi Function Apparatus>

Figure 1:
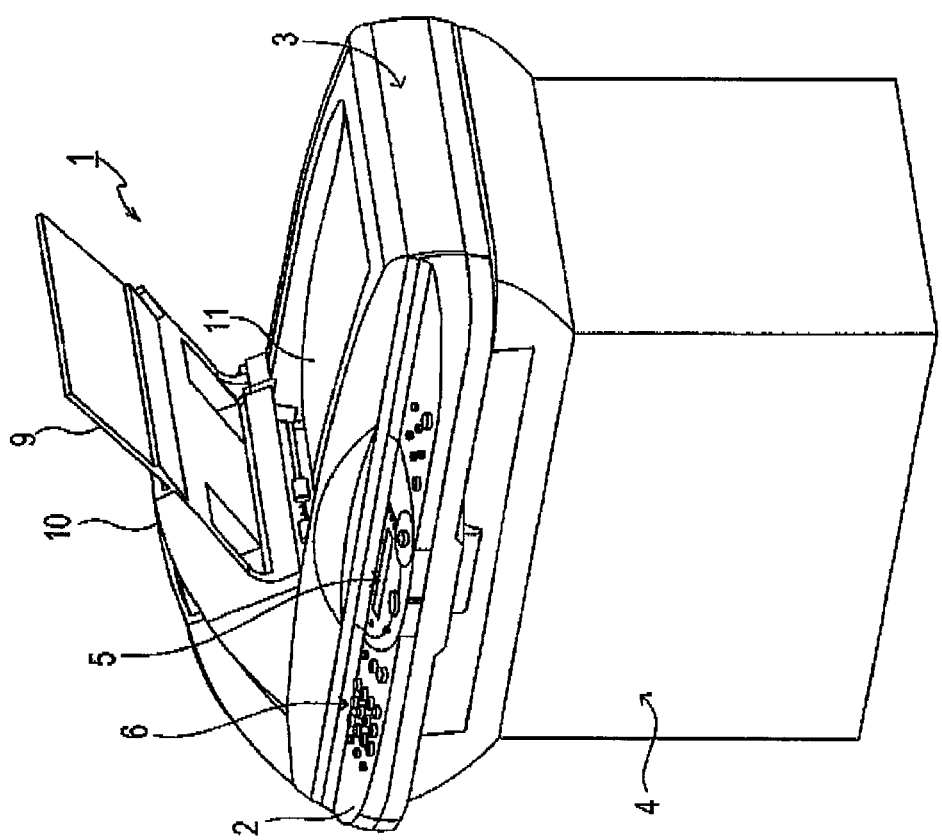
FIG. 1 is a front perspective view of a multi function apparatus in a first embodiment.

As shown in FIG. 1, the multi function apparatus 1 includes an operation panel 2 located at a front thereof, a scanner portion 3 located on an upper part thereof, and a printer portion 4 located on a lower part thereof.

The operation panel 2 includes a display 5 and a plurality of operation buttons 6. The display 5 displays information such as conditions of the multi function apparatus 1. The plurality of operation buttons 6 are provided for a user to conduct various operations of the multi function apparatus 1.

Figure 2:
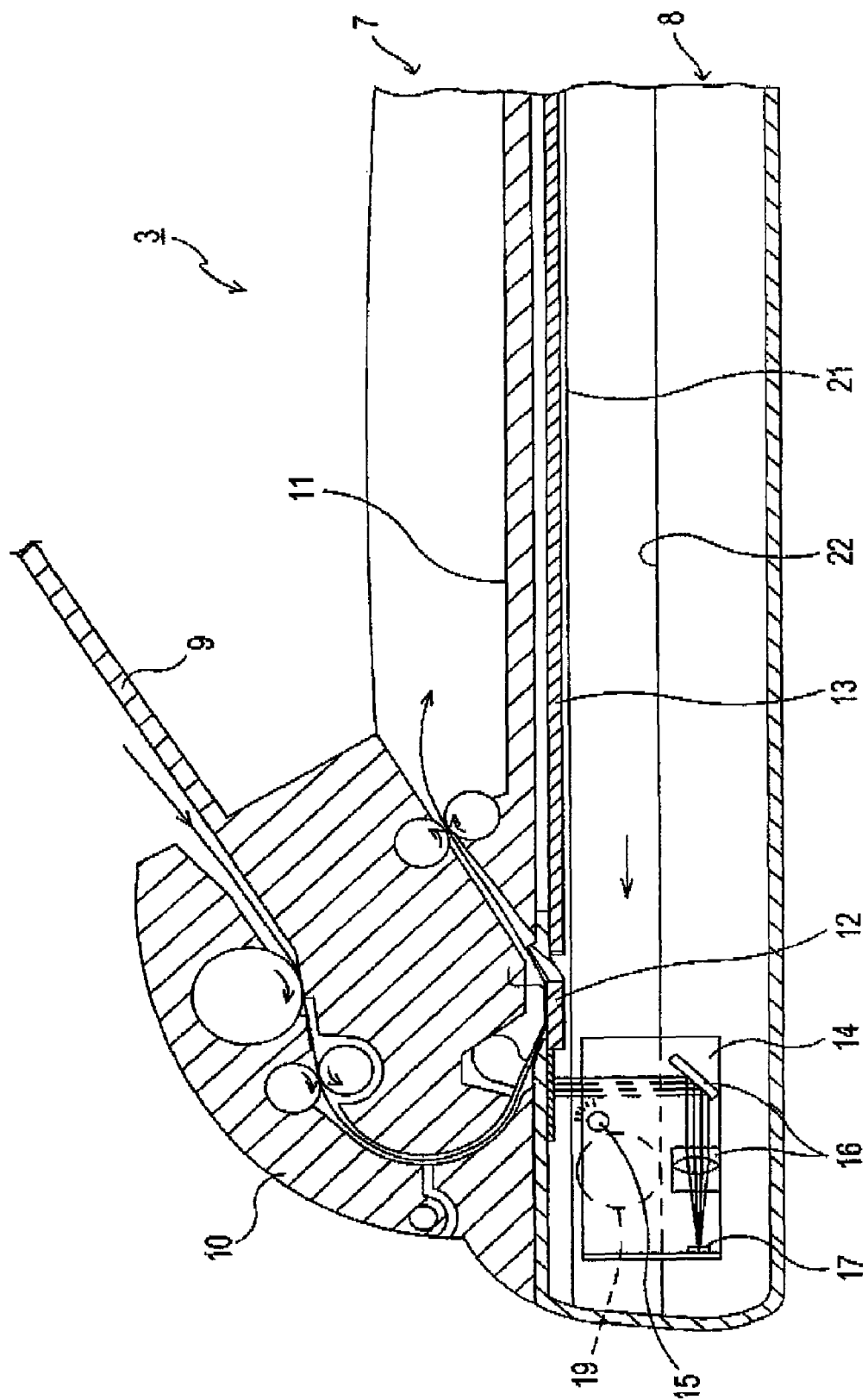
FIG. 2 is a front sectional view of a scanner portion.

As shown in FIG. 2, the scanner portion 3 includes a cover portion 7 located on an upper part thereof, and a flat bed portion 8 located on a lower part thereof.

The cover portion 7 includes a document supplying tray 9 located on an upper left part thereof, a document conveying device 10 located on the left part thereof, and a document discharge tray 11 located on the right part thereof.

The document conveying device 10 takes in documents laid on the document supplying tray 9 one by one into an interior thereof, conveys the documents onto a first platen glass 12 of the flat bed portion 8 as will be described later, and then discharges the documents onto the document discharge tray 11.

The flat bed portion 8 includes the first platen glass 12, a second platen glass 13, and a read head 14.

The read head 14 includes a light source 15, a plurality of optical elements 16 such as a lens and a mirror, and an image sensor 17 inside.

More specifically, the light source 15 irradiates a document placed on upper faces of the first platen glass 12 and the second platen glass 13 of the flat bed portion 8 with light. The plurality of the optical elements 16 condense reflected light from the document into the image sensor 17. The image sensor 17 reads an image of the document from the light condensed by the plurality of the optical elements 16. The image sensor 17 is designed to read an image of a document per each line along a crosswise orientation of a conveying direction of the document (i.e., along a direction orthogonal to the conveying direction).

Figure 3:
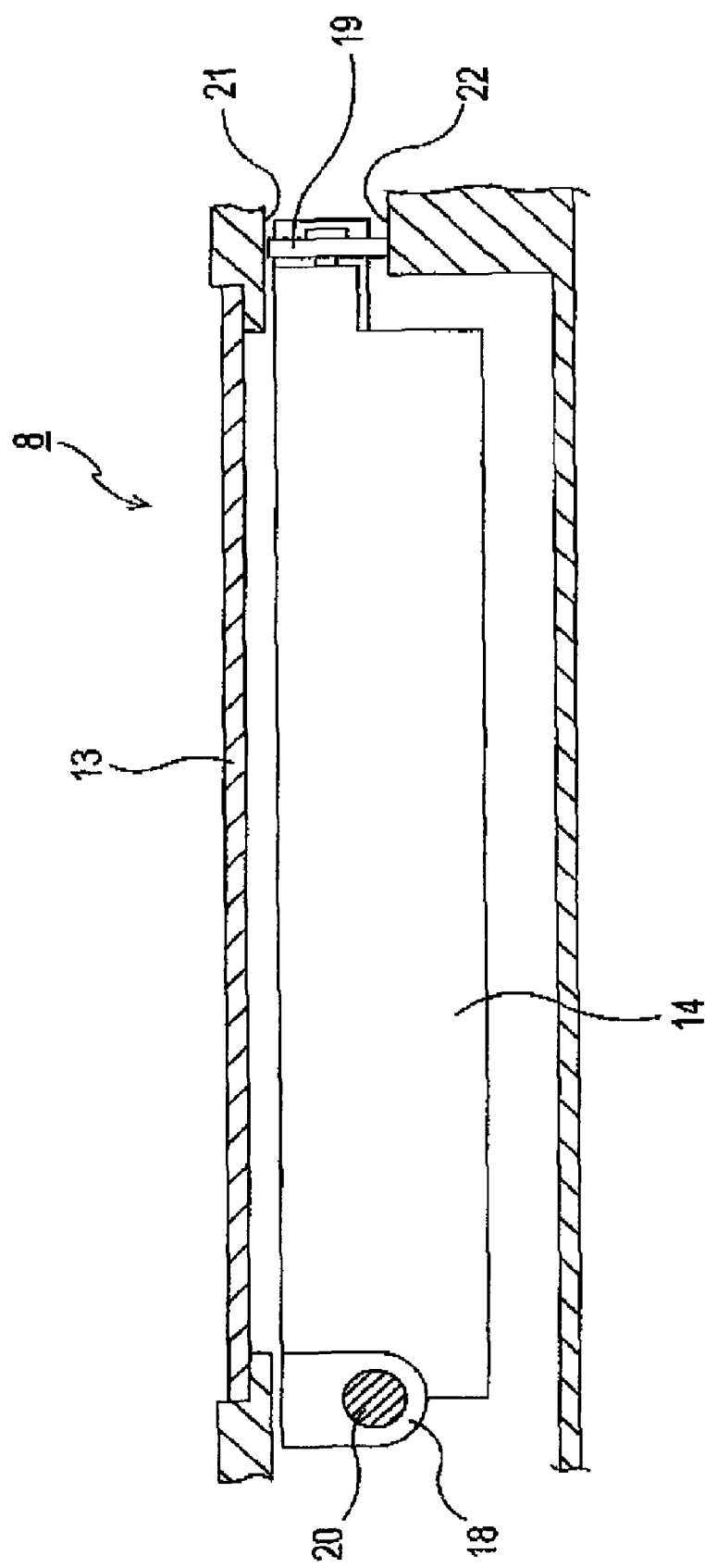
FIG. 3 is a right sectional view of a flat bed portion.

As shown in FIG. 3, the read head 14 includes a bearing portion 18 on a front face side thereof, and a roller 19 on a back face side thereof.

Through the bearing portion 18 is inserted a guide shaft 20 horizontally arranged from a left side end to a right side end of the flat bed portion 8 on a lower part of the front face side of the first and second platen glasses 12 and 13.

The roller 19 is provided between a first guide member 21 horizontally arranged from the left side end to the right side end of the flat bed portion 8 on the back face side of the first and second platen glasses 12 and 13 and a second guide member 22 horizontally arranged from the left side end to the right side end of the flat bed portion 8 on a lower part of the back face side of the first and second platen glasses 12 and 13.

In other words, the read head 14 is installed below the first and second platen glasses 12 and 13 reciprocatively between the left side end to the right side end of the flat bed portion 8.

The multi function apparatus 1 allocates the read head 14 immediately underneath the first platen glass 12 when an image of a document is read by actuating the document conveying device 10 (See FIG. 2). The multi function apparatus 1 horizontally reciprocates the read head 14 immediately underneath the second platen glass 13 when an image of a document placed on the upper face of the second platen glass 13 by a user is read.

Figure 4:
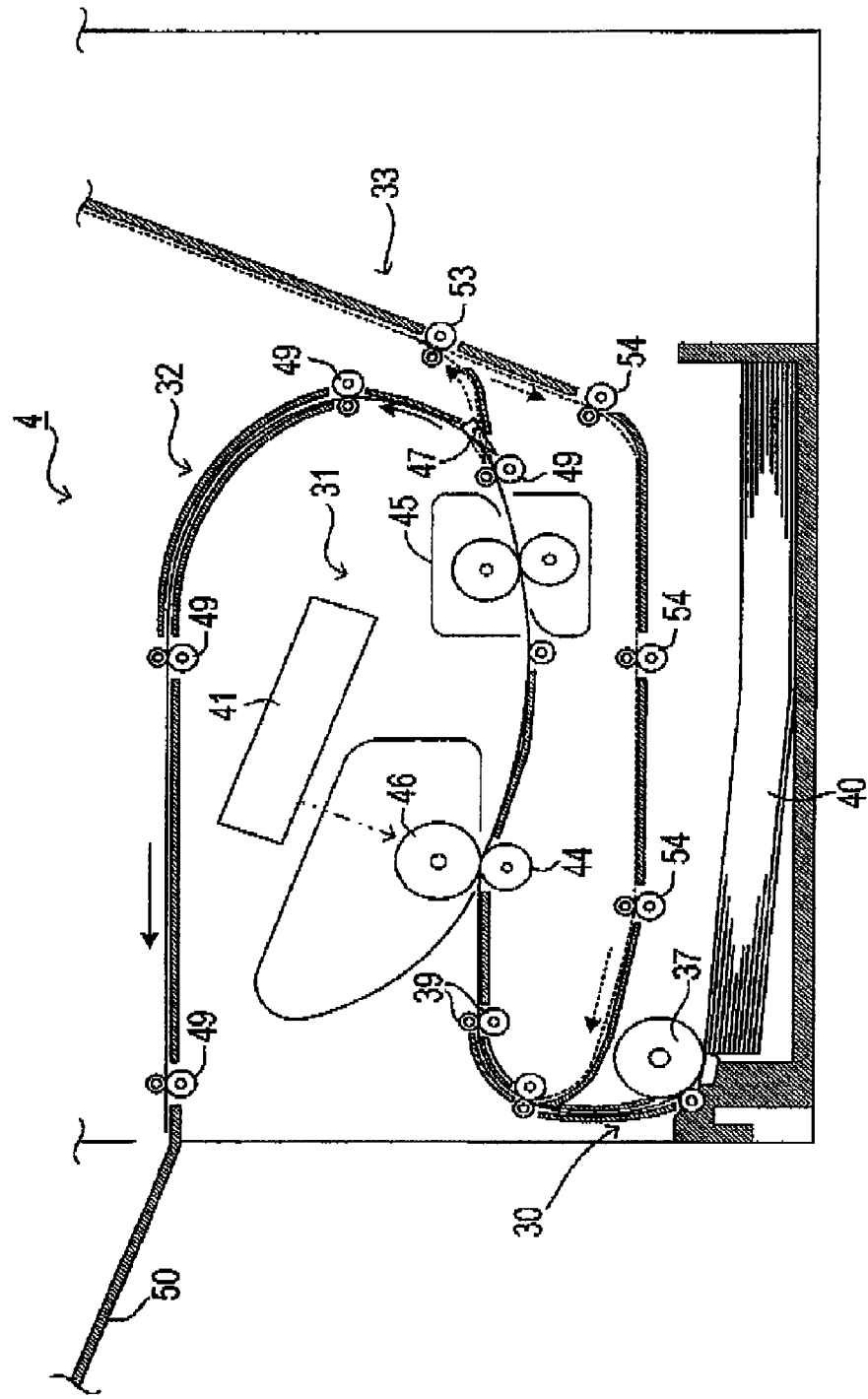
FIG. 4 is a right sectional view of a printer portion.

As shown in FIG. 4, the printer portion 4 includes a paper feeding portion 30 located on a lower part thereof, an image forming portion 31 located in a central part thereof, a paper discharge portion 32 located on an upper part thereof, and a paper refeeding portion 33 located on a back thereof.

The paper feeding portion 30 includes a paper feeding roller 37 and a pair of resist rollers 39.

The image forming portion 31 includes an exposure device 41, a photoconductive drum 46, a transfer roller 44 and a fuser 45.

More specifically, the exposure device 41 irradiates the photoconductive drum 46 with laser beams along a crosswise orientation of a conveying direction of a sheet of paper 40 (i.e., along a direction orthogonal to the conveying direction) to form an electrostatic latent image on the photoconductive drum 46. The photoconductive drum 46 applies toner on the electrostatic latent image formed thereon, developing the electrostatic latent image as a toner image. The transfer roller 44 conveys the sheet of paper 40 to the fuser 45 as transferring the toner image on one side of the sheet of paper 40 which has been conveyed. The fuser 45 conveys the sheet of paper 40 to the paper discharge portion 32 as heat-fusing the toner image on the sheet of paper 40.

The paper discharge portion 32 includes a path switching member 47 and a plurality of paper discharge rollers 49.

More specifically, the path switching member 47 is displaced by an electromagnetic actuator (not shown), and guides the sheet of paper 40 to the paper discharge rollers 49 or the paper refeeding portion 33. The paper discharge rollers 49 guide the sheet of paper 40 to a paper discharge tray 50 provided outside of the printer portion 4.

The paper refeeding portion 33 includes a first paper refeeding roller 53 and a plurality of second paper refeeding rollers 54.

More specifically, the first paper refeeding roller 53 once conveys the sheet of paper 40 to the upper part of the printer portion 4, and then conveys the sheet of paper 40 to the lower part of the printer portion 4. The plurality of the second paper refeeding rollers 54 convey the sheet of paper 40 which has been conveyed to the lower part of the printer portion 4 to the resist rollers 39 respectively.

In other words, the sheet of paper 40 reconveyed from the paper refeeding portion 33 to the resist rollers 39 has the sides flipped with respect to when being conveyed from the paper feeding portion 30. In addition, an end of the sheet of paper 40 which has been a downstream side of a conveying direction becomes an upstream side of the conveying direction.

Figure 5:
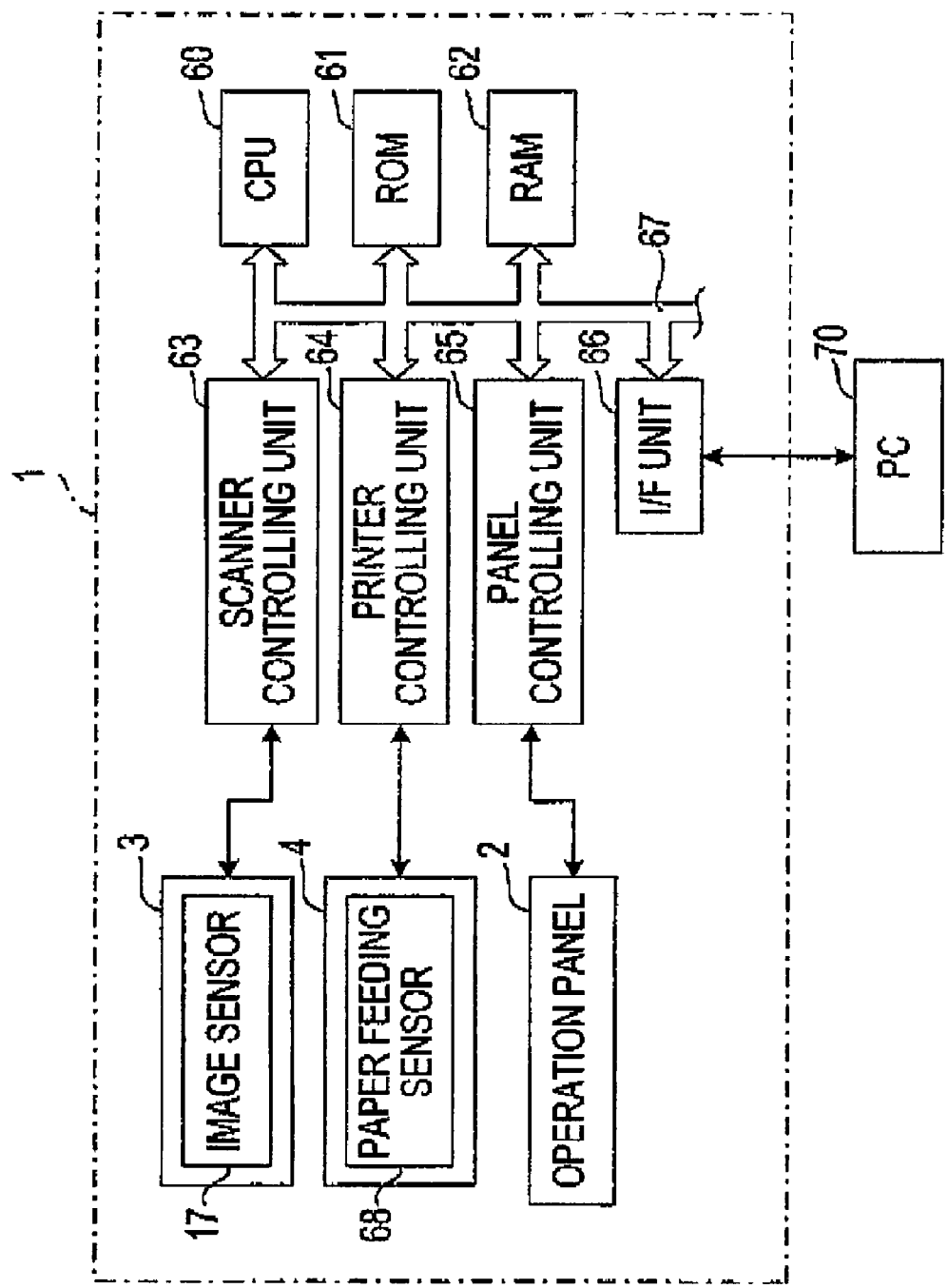
FIG. 5 is a configuration block diagram of a control system in the multi function apparatus.

As shown in FIG. 5, the multi function apparatus 1 is provided with a central processing unit (CPU) 60, a read-only memory (ROM) 61, a random-access memory (RAM) 62, a scanner controlling unit 63, a printer controlling unit 64, a panel controlling unit 65 and an interface (I/F) unit 66, all of which are interconnected via a bus 67.

The CPU 60 carries out various processings in accordance with various programs stored in the ROM 61.

The scanner controlling unit 63 controls various parts of the scanner portion 3 in accordance with a command from the CPU 60. The scanner controlling unit 63 also outputs image data of an image read by the image sensor 17 of the scanner portion 3 to the CPU 60.

The printer controlling unit 64 controls various parts of the printer portion 4 in accordance with a command from the CPU 60. The printer controlling unit 64 also outputs a detection result of a paper feeding sensor 68 of the printer portion 4 to the CPU 60. The paper feeding sensor 68 is arranged at a downstream side of a paper conveying direction of the pair of the resist rollers 39. The paper feeding sensor 68 is configured to turn on a detection signal while the sheet of paper 40 is detected and turns off the detection signal while the sheet of paper 40 is not detected. That is, a change in the detection signal from off to on indicates that the paper feeding sensor 68 detects a downstream side end of the paper conveying direction in the sheet of paper 40. On the other hand, a change in the detection signal from on to off indicates that the paper feeding sensor 68 detects an upstream side end of the paper conveying direction in the sheet of paper 40.

The panel controlling unit 65 outputs a command which is input from the operation buttons 6 of the operation panel 2 to the CPU 60. The panel controlling unit 65 also displays information in accordance with a command from the CPU 60 on the display 5 of the operation panel 2.

The interface unit 66 is connected to a personal computer (PC) 70 outside of the multi function apparatus 1 and establishes communications between the CPU 60 and PC 70.

<Overview of Copying Operation>

Now, description is given on the outline of an operation wherein multi function apparatus 1 copies respective images formed on one side of a plurality of documents on both sides of each paper.

Figure 6:
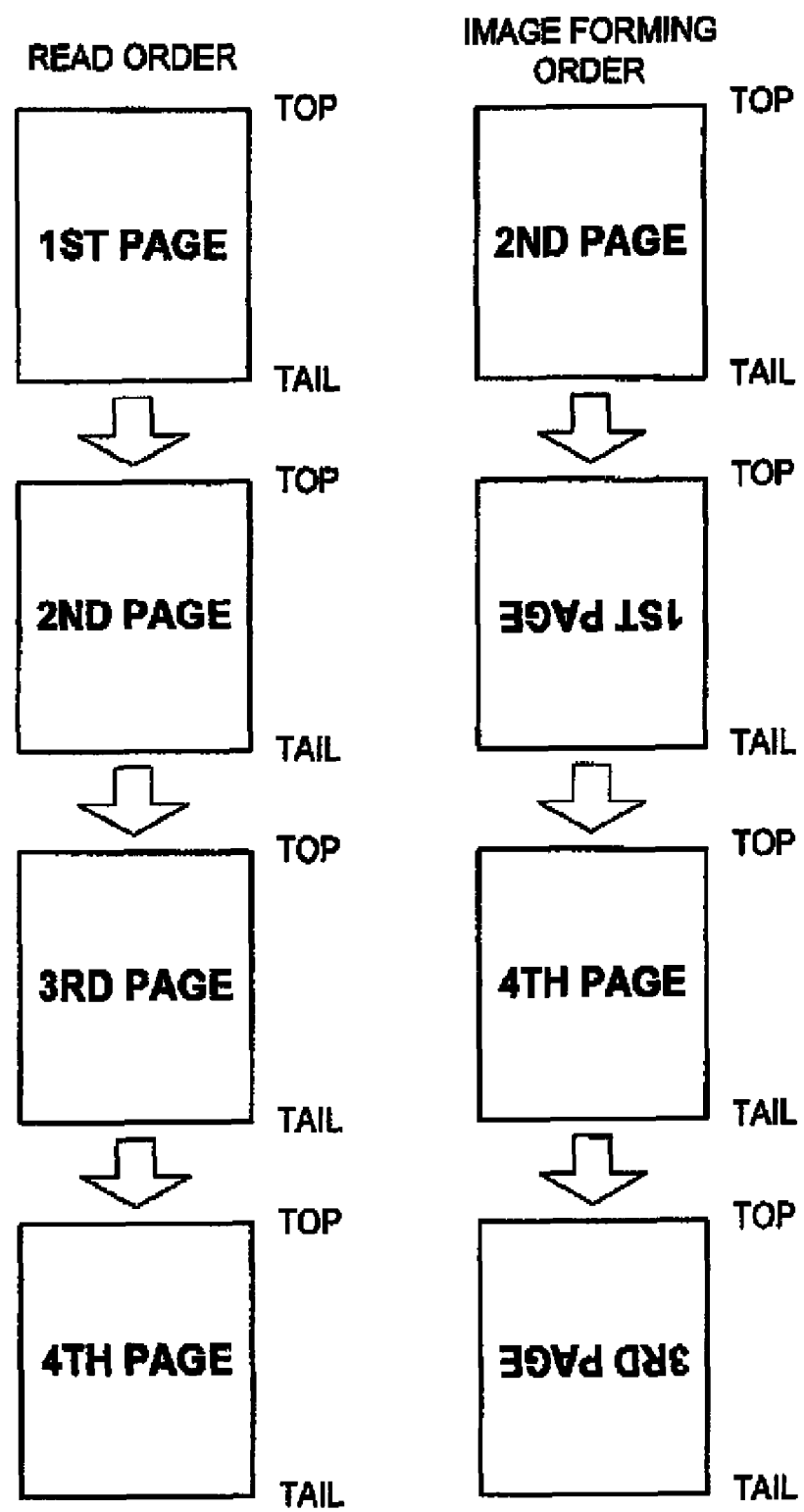
FIG. 6 is an explanatory diagram of an overview of an operation wherein the multi function apparatus copies an image formed on one side of a plurality of documents respectively on both sides of each sheet of paper.

As shown in FIG. 6, the multi function apparatus 1 takes in a plurality of documents in sequence into the document conveying device 10 and reads an image on one side of the respective documents line by line in sequence with the image sensor 17.

The multi function apparatus 1 forms an image on the document which has been read in even number order (that is, an even number of pages) on one side of a sheet of paper and then forms an image of the document which has been read in odd number order (that is, an odd number of pages) on the other side of the sheet of paper as shown in FIG. 6 in order that printed paper loaded on the paper discharge tray 50 is placed in the paging order. In the multi function apparatus 1, however, the upstream side end of a sheet of paper is turned into the downstream side end when the sides of the sheet of paper are flipped as described above. Therefore, the multi function apparatus 1 forms an image of each line on the document which has been read in odd number order on the sheet of paper in the inverse order to the read order.

<Copying Process>

Hereinafter, a copying process of copying an image formed on a document on a sheet of paper among various processes the CPU 60 carries out will be described in detail.

In order to simplify the description on the copying process, the description is given citing an example of copying a document composed of two pages on a sheet of paper. Since the copying process in the case of more than two pages can be realized, for example, by repeatedly performing the process as will be described below, the description thereof is omitted.

The CPU 60 performs the process when the operation button 6 is operated and a command for copying is given to the CPU 60.

Figure 7:
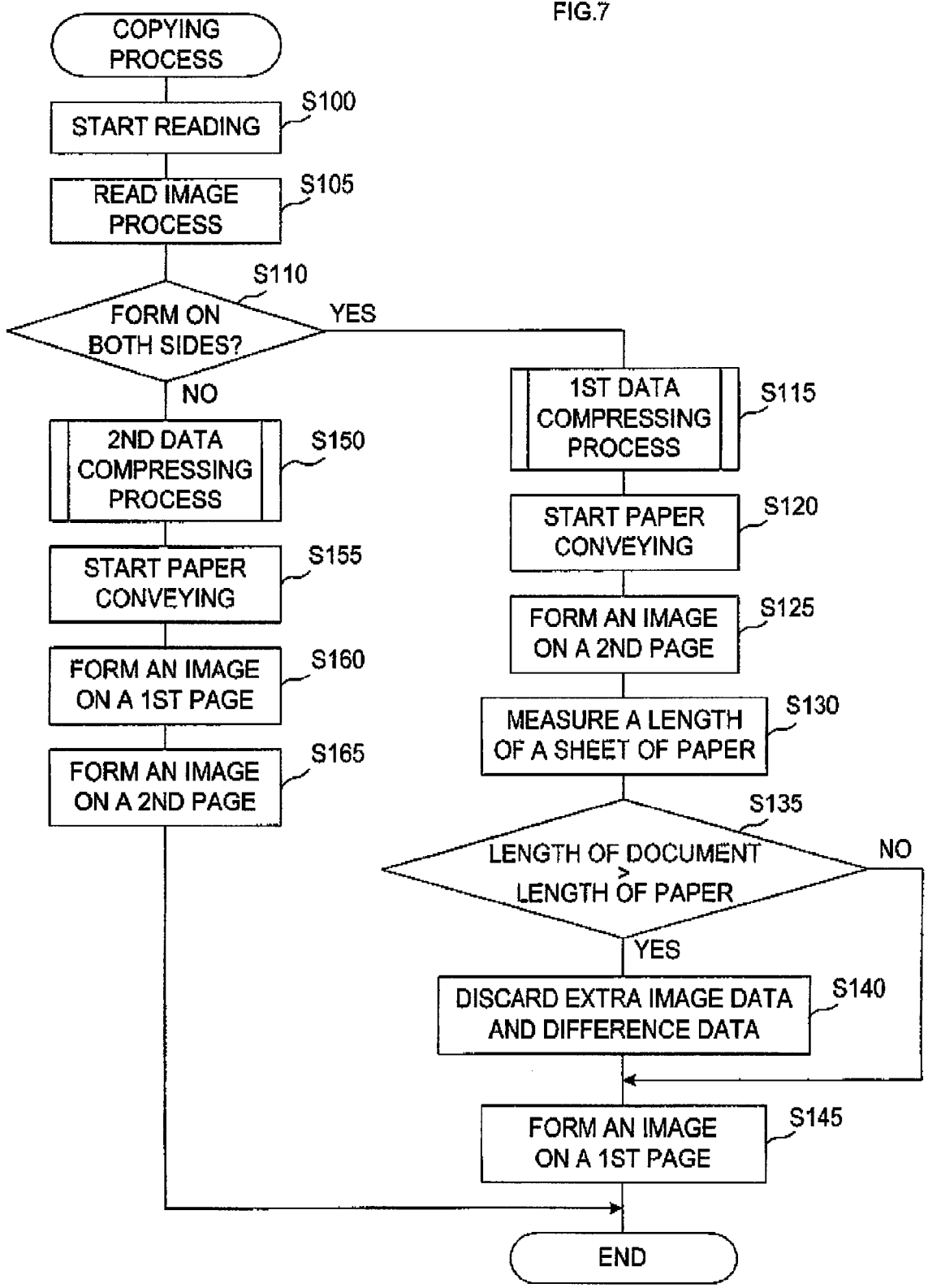
FIG. 7 is a flow chart showing a copying process in the first embodiment.

As shown in FIG. 7, the document conveying device 10 is actuated first in the process. As reading of an image formed on one side of each document is started (S100), a read image process such as correcting image data of the read image is carried out (S105). Then, whether a setting of forming an image on both sides of a sheet of paper is performed by a user is determined at the time of the command for copying as described above (S110).

When an image is formed on both sides of a sheet of paper (S110: Yes), that is, when the copying process as described by using FIG. 6 is performed, a first data compressing process as will be described later is carried out (S115), thereafter image data of each line on each document is compressed.

Then, conveying of a sheet of paper is started (S120). As described in FIG. 6, while image data of each line on the second paged (the even paged) document is firstly decompressed into the original image data, an image is formed on one side of the sheet of paper (S125). Therewith, a length of the sheet of paper along the conveying direction is measured (S130). More specifically, the length of the sheet of paper is measured in S130 based on a conveying rate of the sheet of paper and a duration from detection of a downstream side end of the sheet of paper to detection of an upstream side end of the sheet of paper by the paper feeding sensor 68.

After the measurement, whether the measured length of the sheet of paper is shorter than a length of the document is determined (S135). The length of the document is determined, for example, based on the number of lines in the image data of the document. When the length of the sheet of paper is equal to or longer than the length of the document (S135: No), the process immediately moves on to S145 as will be described later.

On the other hand, when the length of the sheet of paper is shorter than the length of the document (S135: Yes), image data of each line in an area which is longer than the length of the sheet of paper among image data of each line on the first paged (the odd paged) document is discarded (S140), thereafter moving on to S145 as will be described later. In other words, as described in FIG. 6, when an image is formed on both sides of a sheet of paper after a plurality of documents are read, order of image forming is reversed between the odd pages and even pages. It is required from the viewpoint of visual quality to align the top positions of the images on both sides of the odd pages and even pages. Here, image forming order is reversed between the odd pages and even pages, and a need to perform image forming after partially discarding an image on a lower part of the odd pages arises when the length of the sheet of paper is shorter than the length of the document in order to align the top positions of images on the odd pages and even pages. Therefore, a processing such as S140 is carried out.

In S145, while image data of each line on the first paged (the odd paged) document is decompressed into the original image data, an image is formed on one side of the sheet of paper, and then the process is terminated.

In S110, when an image is formed only on one side of the sheet of paper (S110: No), a second data compressing process as will be described later is conducted (S150) and image data of each line on each document is compressed.

Then, conveying of a sheet of paper is started (S155). While image data of each line on the first paged (the odd paged) document is decompressed into the original image data, an image is formed on one side of the sheet of paper (S160). Subsequently, while image data of each line on the second paged (the even paged) document is decompressed into the original image data, an image is formed on one side of the next sheet of paper (S165). Then, the process is terminated.

Now, compression and decompression of image data the CPU 60 carries out in the copying process are described in detail.

Figure 8:
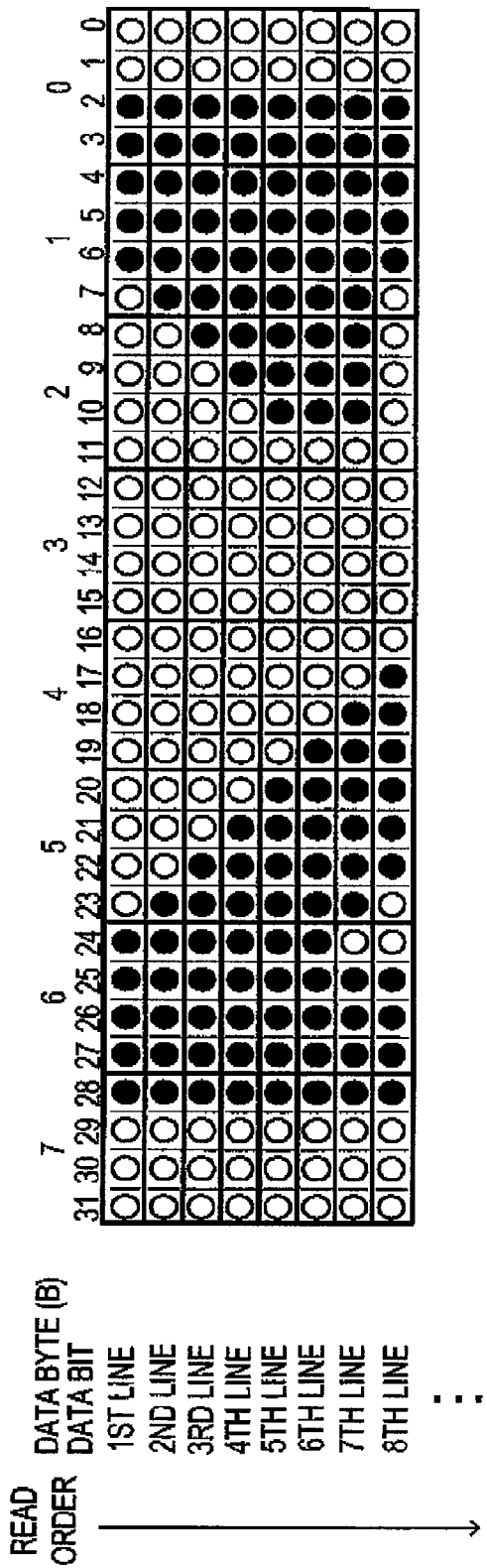
FIG. 8 is an explanatory diagram of an example of compressing image data of each line in the case where read order and forming order of an image are identical.
Figure 9:
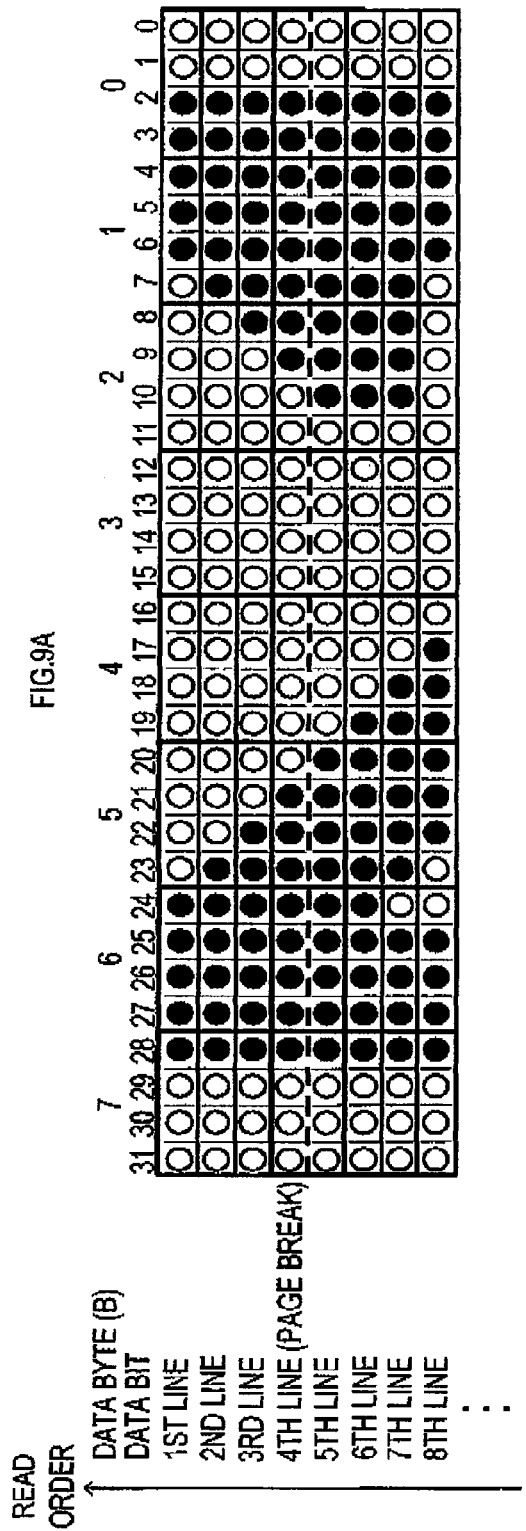
FIG. 9 is an explanatory diagram of an example of compressing image data of each line in the case where read order and forming order of an image are inversed.

Referring to examples as shown in FIGS. 8 and 9, compression of image data the CPU 60 conducts is described in detail.

In the first data compressing process (S115) mentioned above, the CPU 60 carries out a compressing process as shown in FIG. 8 for image data of an even page in which read order and forming order are identical. The cases in which the read order and the forming order are identical correspond to the states of the second and the fourth pages in FIG. 6.

The CPU 60 stores image data of the top line to be formed on a sheet of paper first (corresponding to the line which has been read first) in the RAM 62 without compressing the data. Also, the CPU 60 generates difference data which indicates a difference between image data of each line after the top line and image data of a line which has been read just before each line, and stores only the difference data in the RAM 62.

Furthermore, in the first data compressing process, the CPU 60 carries out a compressing process as shown in FIG. 9 for image data of an odd page in which read order and forming order are reversed. The cases in which the read order and the forming order are reversed correspond to the states of the first and the third pages in FIG. 6. In addition, when read order and forming order are inversed, MR encoding compression is not performed in sequence from image data corresponding to the leading end of a document toward the trailing end of the document, but performed in sequence from image data corresponding to the trailing end of the document toward the leading end of the document.

Figure 10:
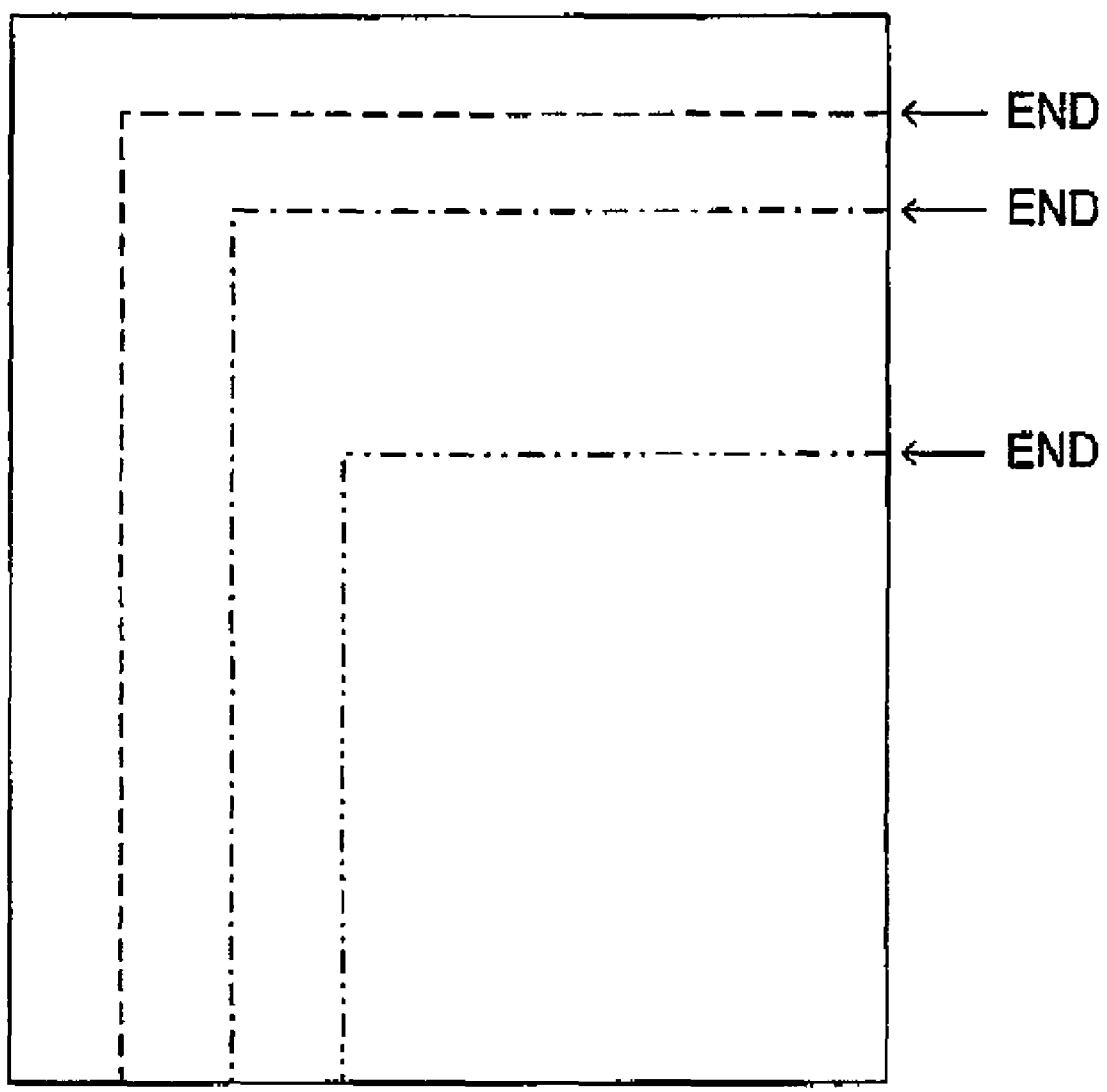
FIG. 10 is an explanatory diagram showing an overview of ends of various standard-sized sheet of paper.

That is, the CPU 60 stores image data of the top line to be formed on a sheet of paper first (corresponding to the line which has been read last) and image data of a designated line other than the top line which has been predesignated in the RAM 62 without compressing the data. Also, the CPU 60 stores only difference data between image data of a non-designated line except the top and designated lines and image data of a line which has been read just after each non-designated line (corresponding to a line to be formed immediately before each non-designated line) in the RAM 62. A line which is immediately after a line corresponding to a page break (end: See FIG. 10) of various standard-sized sheet of paper is set as the designated line.

In the second data compressing process (S150) mentioned above, the CPU 60 compresses image data on all documents in the same manner as FIG. 8.

Figure 11:
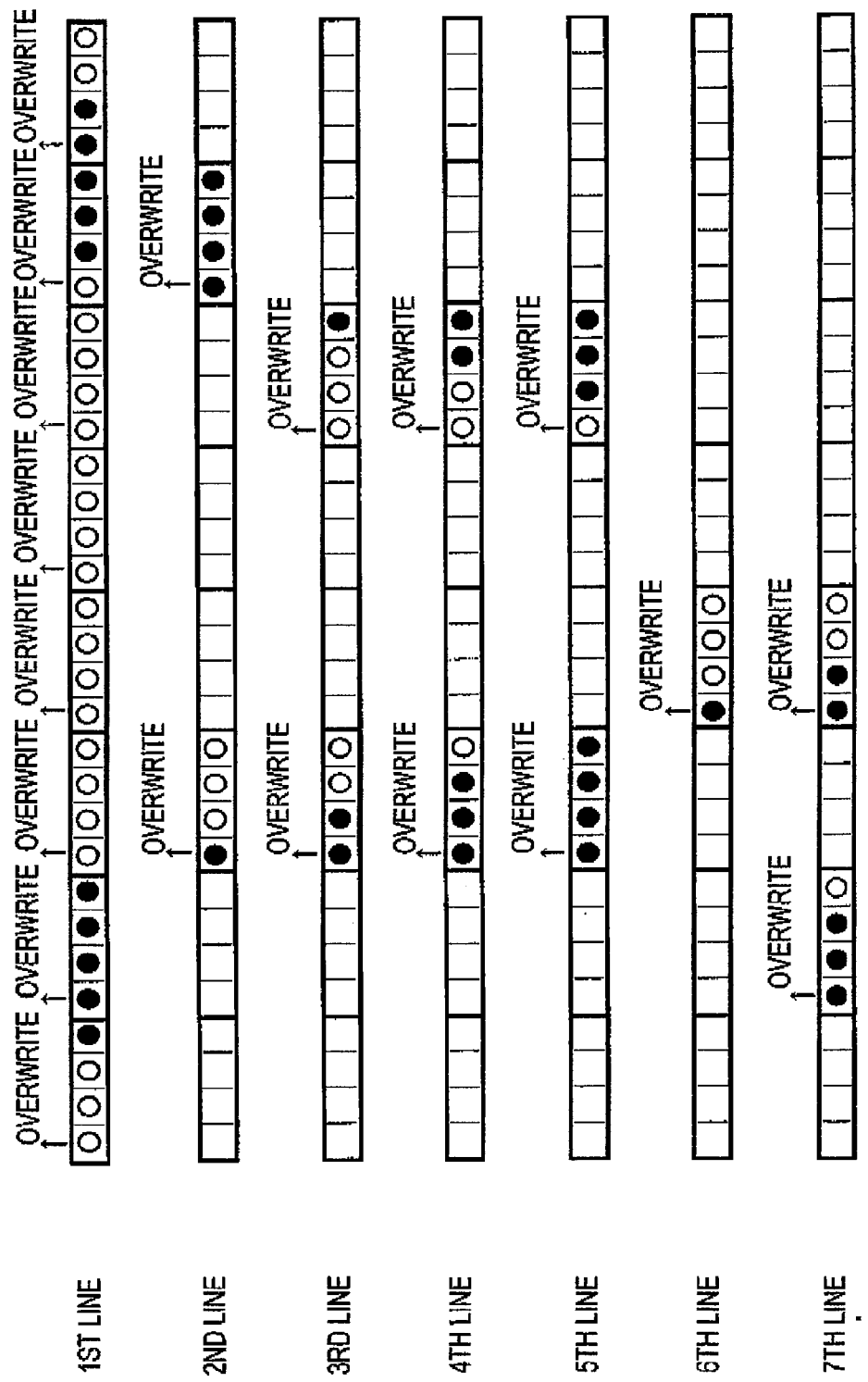
FIG. 11 is an explanatory diagram of an example for a CPU to decompress image data compressed in read order.
Figure 12:
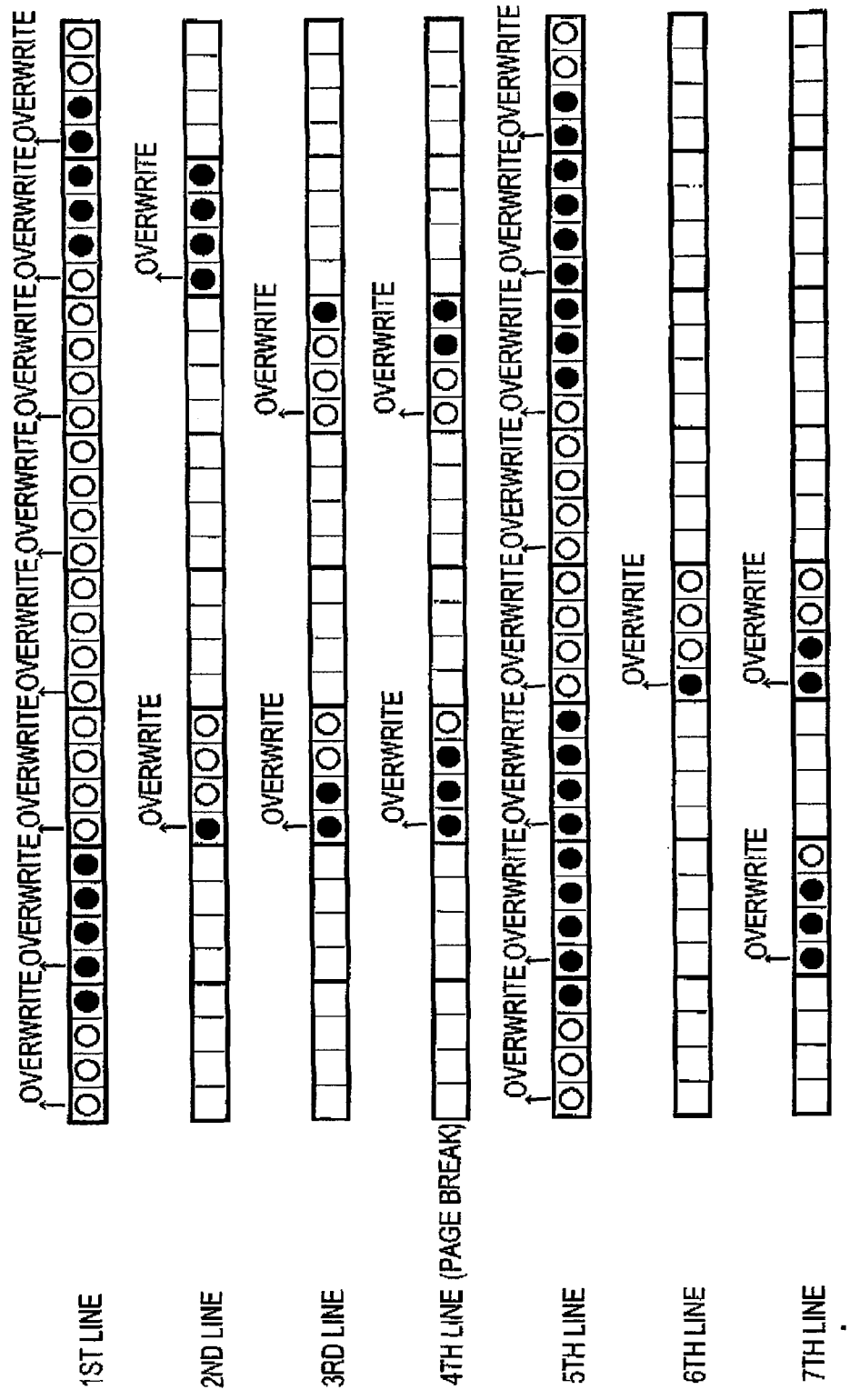
FIG. 12 is an explanatory diagram of an example for the CPU to decompress image data compressed in inverse order to the read order.
Figure 13:
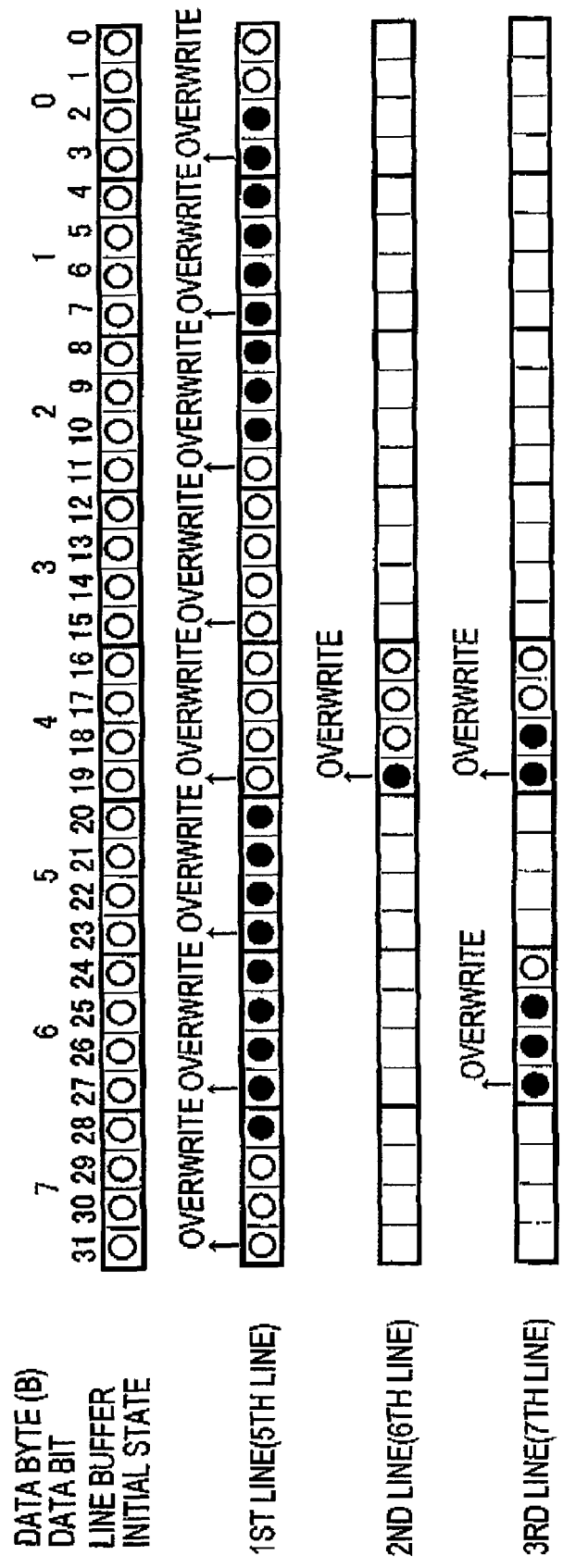
FIG. 13 is an explanatory diagram of another example for the CPU to decompress image data compressed in inverse order to the read order.

Now, decompression of image data the CPU 60 carries out is described in detail with reference to examples as shown in FIGS. 11 to 13.

In the aforementioned S125, S160 and 8165, the CPU 60 decompresses image data compressed in the read order as shown in FIG. 11.

That is, the CPU 60 overwrites image data of the non-compressed top line on a predetermined buffer area (line buffer) first. The CPU 60 sequentially decompresses image data of each line into the original image data by sequentially overwriting the difference data of each line other than the top line on the line buffer.

The CPU 60 discards image data of each line from the top line to the line just before the designated line in S140 when the CPU 60 decompresses image data compressed in the inverse order to the read order, and a length of a sheet of paper is shorter than a length of a document. In this case, image data of a line in an area which is longer than the length of the paper is discarded as shown in FIGS. 12 and 13 (here, four lines; the 1st to 4th lines as shown in FIG. 12 are discarded.). Image data of a designated line (here, the 5th line) is overwritten on the line buffer first as shown in FIG. 13. Then, difference data of each non-designated line after the designated line is overwritten on the line buffer in sequence, thereby image data of each line is decompressed sequentially into the original image data. As a result, a generation of the required image data can be carried out promptly.

Effects in the First Embodiment

As described above, the multi function apparatus 1 can start decompression of image data from the designated line since not only image data of the top line but also image data of the designated line are stored in a non-compressed state when compressing the image data.

That is, according to the multi function apparatus 1, starting decompression from image data of a designated line based on a length of a sheet of paper when a document is copied allows for an image to be formed appropriately in accordance with the length of the sheet of paper.

In the multi function apparatus 1, when a length of a sheet of paper is shorter than a length of a document, image data and difference data of lines in an area which is longer than the length of the sheet of paper are discarded. Accordingly, forming an image based on the extra image data can be avoided.

In addition, in the multi function apparatus 1, only the difference data is stored as image data of each line other than the top line when an image is formed in a read order. Consequently, more image data can be compressed and stored accordingly.

Also, in the multi function apparatus 1, the designated lines are set corresponding to ends of standard-sized sheets of paper. As a result, an image can be formed appropriately in accordance with a standard-sized sheet of paper. Also, the multi function apparatus 1 is provided with the paper refeeding portion 33. Thus, an image can be appropriately formed on both sides of a sheet of paper.

Variations of the First Embodiment

Moreover, in the first embodiment, image data of the top line and image data of the designated line are not compressed. However, the data may be compressed with a data format capable of decompressing into the original image data by itself (a run-length compression format, for example).

The designated lines are set according to ends of various standard-sized sheets of paper in the first embodiment. However, the designated lines may be set every number of lines less than the total number of lines on one side of a document (for example, 128 lines).

In this case, compressibility of image data is lowered, but an image can be formed appropriately even if a sheet of paper has nonstandard-size.

Also in the present embodiment, image data is stored in the RAM 62 mounted on the multi function apparatus 1. However, the image data may be stored in an exterior of the multi function apparatus (e.g., a storage area of the PC 70).

Also, in the present embodiment, the paper refeeding portion 33 is designed to not only flip the sides of the paper, but also reverse the orientation of the paper 40 with respect to the conveying direction. However, the paper refeeding portion 33 may be designed not to reverse the orientation of the paper 40 with respect to the conveying direction but to maintain the same orientation of the paper 40 with respect to the conveying direction as the orientation when the paper 40 is conveyed. In this case, the image data of the document read in odd number order (that is, an odd number of pages) may be compressed and decompressed in the same manner as the image data of the document read in even number order (that is, an even number of pages).

Second Embodiment

A second embodiment partially differs in a flow of the copying processing from the first embodiment, and others are identical to the first embodiment.

Therefore, only differences from the copying process in the first embodiment are described here.

<Copying Process>

Figure 14:
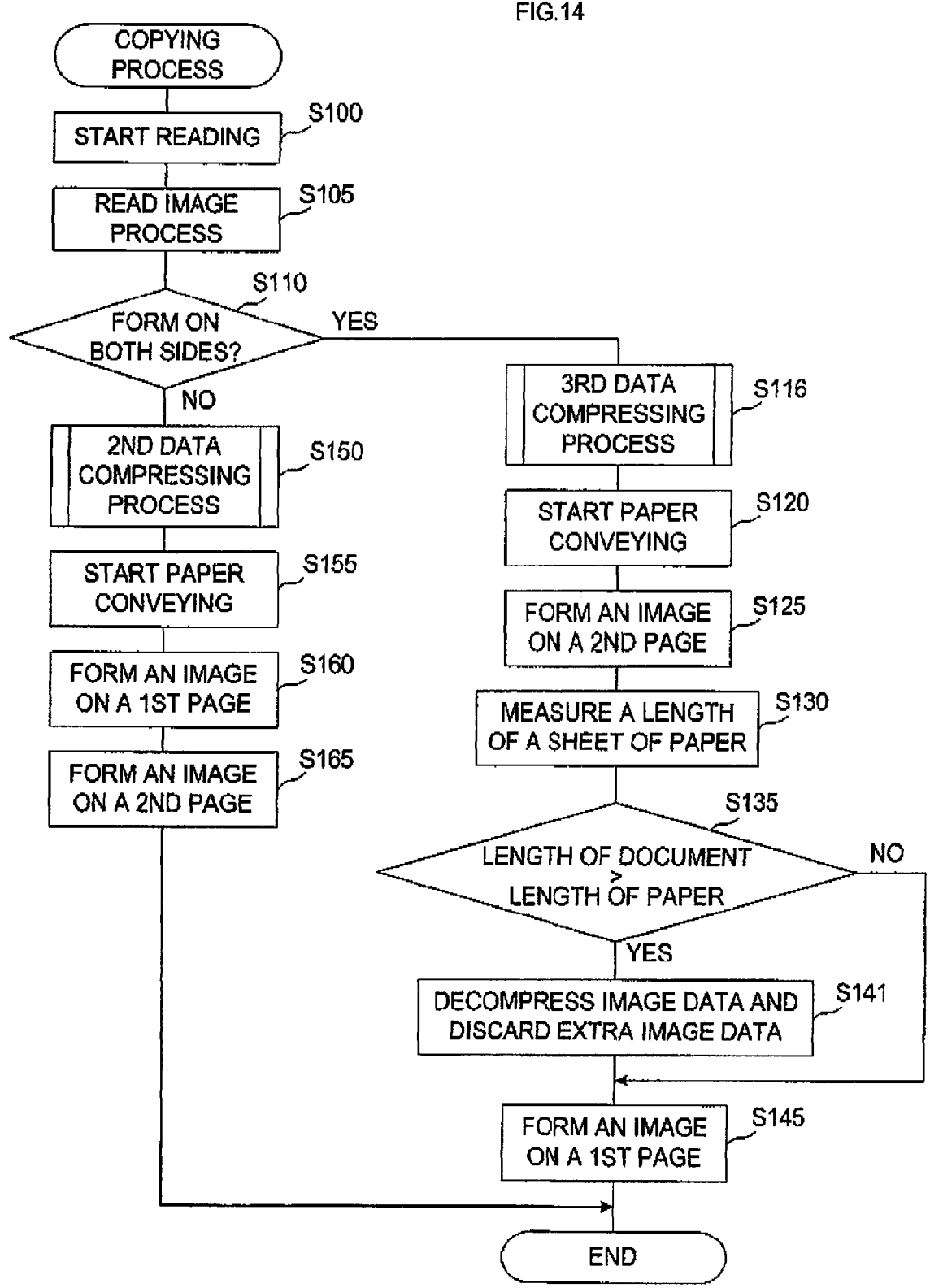
FIG. 14 is a flow chart showing a copying process in a second embodiment.

As shown in FIG. 14, in S116 (a third data compressing process) of the copying process in the second embodiment, image data on an even page is compressed in the same manner as S115 of the first embodiment while image data on an odd page is compressed as follows.

Image data of a top line to be formed on a sheet of paper first (corresponding to a line which has been read last) is stored in a RAM 62 without being compressed. For image data of each line after the top line, only difference data from image data of a line which has been read immediately after each line (corresponding to a line to be formed just before each line) is stored in the RAM 62.

In the copying process of the second embodiment, S141 is carried out instead of S140 when a length of a sheet of paper is determined to be shorter than a length of a document (S135:Yes).

That is, in S141, image data of all lines on an odd page is decompressed in advance based on image data of a top line and difference data of the other lines on the odd page for the duration from when a sheet of paper on which an image on a second page (an even page) has been formed passes through the paper feeding sensor 68 to when the paper feeding sensor 68 detects a front end of the sheet of paper on which an image on a first page (an odd page) is formed (that is, a front end of a sheet of paper delivered via the paper refeeding portion 33). In the meantime, image data of each line in an area which is longer than the length of the sheet of paper among decompressed image data is discarded in sequence.

In S145 of the copying process in the second embodiment, when the paper feeding sensor 68 detects a front end of a sheet of paper, an image is formed on the sheet of paper based on image data whose unnecessary area has been discarded.

Effects in the Second Embodiments

As described above, the multi function apparatus 1 of the second embodiment exhibits the same effects as the multi function apparatus 1 of the first embodiment.

Furthermore, since image data of all lines except the top line is completely compressed, compressibility is higher than in the multi function apparatus 1 of the first embodiment. Accordingly, more image data can be stored in the RAM 62 as compared to the case of the multi function apparatus 1 of the first embodiment.

Other Embodiments

Although embodiments of the present invention were described above, the present invention is not restricted to the above first and second embodiments and various forms can be taken as long as the various forms fall within the technical scope of the present invention.

For example, the present invention is applied to a multi function apparatus in the above first and second embodiments. However, the present invention may be applied to an image forming apparatus in other forms (for example, a copying apparatus, a printer, a facsimile apparatus, etc.). Also, the present invention may be applied to a system including a personal computer and an image forming apparatus. When the present invention is applied to such a system, compression and decompression of image data may be performed at the personal computer side while read and formation of an image may be performed at the image forming apparatus side.

What is claimed is:

1. An image forming system comprising:
   a processor;
   memory storing computer-readable instructions that, when executed by the processor, cause the image forming system to provide:
   a first data storage unit that stores, in a memory area, image data, obtained by reading an image of a document, of a top line and of at least one designated line other than the top line which is predesignated among a plurality of lines of the image, the top line being the first line to be formed on a recording medium where a length of the recording medium along a crosswise orientation of each of the lines is longer than a length of the document along a crosswise orientation of each of the lines;
   a second data storage unit that generates difference data which indicates a difference between image data of at least one non-designated line, which is a line different from the top line and the at least one designated line, and image data of a line adjacent to the at least one non-designated line, and stores the generated difference data in the memory area;
   a comparing device that compares a length of the recording medium along a crosswise orientation of each of the lines with a length of the document along a crosswise orientation of each of the lines;
   a data discarding device that discards image data and difference data of one or more lines from the top line to a line just before the designated line in an area which is longer than the length of the recording medium from the image data and the difference data stored in the memory area when the comparing device determines that the length of the recording medium is shorter than the length of the document; and
   a data decompressing device that sequentially decompresses the image data and the difference data stored in the memory area to obtain non-compressed image data for each line among a plurality of lines of a copy of the image; and
   an image forming device configured to form the copy of the image on the recording medium, based on the non-compressed image data, the copy including the top line when a length of the recording medium along a crosswise orientation of each of the lines is longer than a length of the document along a crosswise orientation of each of the lines, but not including the one or more lines from the top line to the line just before the designated line when a length of the recording medium along a crosswise orientation of each of the lines is shorter than a length of the document along a crosswise orientation of each of the lines,
   wherein the plurality of lines of the image is read in a predesignated order, and lines of the copy are formed on the recording medium in an inverse order from the read order.

2. The image forming system according to claim 1, wherein the adjacent line is a line to be formed on the recording medium prior to the at least one non-designated line.

3. The image forming system according to claim 1, wherein the image forming device is further configured to form lines of another copy of another image on the recording medium in a same order as a read order of the lines of the another image.

4. The image forming system according to claim 1, wherein the at least one designated line is a line corresponding to an end of the recording medium with a predetermined standard size.

5. The image forming system according to claim 1, wherein the at least one designated line corresponds to any one of all the lines on one side of the document.

6. The image forming system according to claim 1, further comprising:
   a resupplying device that flips sides of the recording medium on which the copy of the image has been formed by the image forming device and resupplies the recording medium to the image forming device.

7. An image forming apparatus comprising the image forming system according to claim 1.

8. A copying apparatus comprising:
   an image forming apparatus according to claim 7; and
   an image reading device that reads an image on a document, obtains image data and supplies the obtained image data to the image forming apparatus.

9. An image forming system comprising:
   a processor;
   memory storing computer-readable instructions that, when executed by the processor, cause the image forming system to provide:
   a first data storage unit that stores, in a memory area, image data, obtained by reading an image of a document, of a top line among a plurality of lines of the image, the top line being the first line to be formed on a recording medium where a length of the recording medium along a crosswise orientation of each of the lines is longer than a length of the document along a crosswise orientation of each of the lines;
   a second data storage unit that generates difference data which indicates a difference between image data of at least one line other than the top line and image data of a line adjacent to the at least one line and stores the generated difference data in the memory area;
   a data decompressing device that decompresses the image data and the difference data stored in the memory area;
   a comparing device that compares a length of the recording medium along a crosswise orientation of each of the lines with a length of the document along a crosswise orientation of each of the lines; and a data discarding unit that discards image data of one or more of the lines including the top line in an area which is longer than the length of the recording medium from all of the image data decompressed by the data decompressing device, when the comparing device determines that the length of the recording medium is shorter than the length of the document; and an image forming device configured to form a first copy of the image on the recording medium, based on all of the image data, including the top line, decompressed by the data decompressing device, when the comparing device determines that the length of the recording medium is equal to or longer than the length of the document; and form a second copy of the image on the recording medium, based on image data, not including the top line, remaining after the data discarding unit discards image data, when the comparing device determines that the length of the recording medium is shorter than the length of the document.

10. The image forming system according to claim 9, wherein the adjacent line is a line to be formed on the recording medium prior to the at least one line.

11. The image forming system according to claim 9, further comprising:

a resupplying device that flips sides of the recording medium on which one of the first copy and the second copy has been formed by the image forming device and resupplies the recording medium to the image forming device.

12. An image forming apparatus comprising the image forming system according to claim 9.

13. A copying apparatus comprising:

an image forming apparatus according to claim 12; and an image reading device that reads an image on a document, obtains image data and supplies the obtained image data to the image forming apparatus.

14. A non-transitory machine readable medium having instructions stored thereon that, when executed by a processor, cause the processor to:

receive image data for each of first lines 1 to N of a first page and each of second lines 1 to M of a second page, where N and M are positive integers and the image data is obtained by reading the first lines one line at a time beginning with first line 1 and ending with first line N and reading the second lines one line at a time beginning with second line 1 and ending with second line M;

determine whether an image is to be formed on both sides of a recording medium;

upon determining that an image is to be formed on both sides of the recording medium, perform the following:

store the image data of a first top line and the image data of a first designated line from among the first lines 1 to N and image data of a second top line from among the second lines 1 to M in a memory area, the designated line corresponding to a predesignated line other than the first top line among the first lines 1 to N;

generate difference data which indicates a difference between the image data of at least one non-designated first line, which is a line from among the first lines 1 to N different from the first top line and the first designated line, and the image data of a line from among the first lines 1 to N adjacent to the at least one non-designated first line;

store the generated difference data in the memory area;

compare a length of the recording medium along a crosswise orientation of each of the first lines with a length of the first page along a crosswise orientation of each of the first lines;

discard, from the memory area, image data and difference data of one or more of the first lines from the first top line to a line just before the first designated line in an area which is longer than the length of the recording medium when the comparing device determines that the length of the recording medium is shorter than the length of the first page; and sequentially decompress the difference data stored in the memory area, after discarding the image data and difference data of the one or more first lines when the comparing device determines that the length of the recording medium is shorter than the length of the first page, to obtain non-compressed image data;

cause an image forming device to form a copy of the second page on one side of the recording medium; and cause the image forming device to form a copy of the first page on the other side of the recording medium based on the non-compressed image data not including the image data of the first top line, wherein the first top line is the first line of the copy of the first page formed on the recording medium and is a line corresponding to the first line N, and wherein the second top line is the first line of the copy of the second page formed on the recording medium and is a line corresponding to the second line 1.

15. The non-transitory machine readable medium according to claim 14, wherein the instructions further cause the processor to:

upon determining that an image is not to be formed on both sides of the recording medium, perform the following:

store, in the memory area, image data of the first top line to be formed on the recording medium;

generate difference data which indicates a difference between the image data of at least one first line other than the first top line and the image data of a first line adjacent to the at least one first line;

store the generated difference data in the memory area; and sequentially decompress the difference data stored in the memory area.

16. The non-transitory machine readable medium according to claim 15, wherein the first line adjacent to the at least one non-designated line is formed on the recording medium prior to forming the at least one non-designated line.

17. The non-transitory machine readable medium according to claim 15, wherein the image data of the first page and the second page are read in a predesignated order.

* * * * *